US009538089B2

(12) United States Patent
Ito et al.

(10) Patent No.: US 9,538,089 B2
(45) Date of Patent: Jan. 3, 2017

(54) IMAGE-TAKING APPARATUS, INFORMATION PROCESSING APPARATUS, AND IMAGE-TAKING SYSTEM

(71) Applicant: SONY CORPORATION, Tokyo (JP)

(72) Inventors: Ryogo Ito, Tokyo (JP); Kazuma Akamatsu, Tokyo (JP); Shunsuke Katsumata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 14/534,503

(22) Filed: Nov. 6, 2014

(65) Prior Publication Data

US 2015/0138374 A1 May 21, 2015

(30) Foreign Application Priority Data

Nov. 18, 2013 (JP) ................................. 2013-237716

(51) Int. Cl.
*H04N 9/73* (2006.01)
*H04N 5/235* (2006.01)
*H04N 5/232* (2006.01)

(52) U.S. Cl.
CPC .......... *H04N 5/2353* (2013.01); *H04N 5/2351* (2013.01); *H04N 5/23206* (2013.01); *H04N 5/23209* (2013.01); *H04N 5/23216* (2013.01); *H04N 5/23293* (2013.01)

(58) Field of Classification Search
CPC H04N 5/2353; H04N 5/23206; H04N 5/2351; H04N 5/23216; H04N 5/23293; H04N 5/23209

USPC .................................... 348/223.1–229.1, 362
See application file for complete search history.

(56) References Cited

U.S. PATENT DOCUMENTS

| 2004/0150724 | A1* | 8/2004 | Nozaki | H04N 1/00347 348/211.4 |
| 2005/0248666 | A1* | 11/2005 | Kim | H04N 5/235 348/230.1 |
| 2007/0153112 | A1* | 7/2007 | Ueda | G03B 19/12 348/335 |
| 2009/0256954 | A1* | 10/2009 | Kranz | H04N 5/238 348/363 |
| 2010/0322532 | A1* | 12/2010 | Jiang | G06T 5/006 382/274 |

\* cited by examiner

*Primary Examiner* — Yogesh Aggarwal
(74) *Attorney, Agent, or Firm* — Chip Law Group

(57) ABSTRACT

There is provided an image-taking system including an information processing apparatus and an image-taking apparatus. The information processing apparatus includes a detector configured to detect brightness of an object image, and to output external brightness information, a determining unit configured to determine if an external image-taking apparatus exists or not, and an output unit configured to output the external brightness information to the image-taking apparatus if the image-taking apparatus exists. The image-taking apparatus includes a detector configured to detect brightness of an object image, and to output internal brightness information, and a controller configured to control exposure based on an exposure value, the exposure value being based on the internal brightness information detected by the detector and external brightness information received from an external apparatus.

12 Claims, 14 Drawing Sheets

IMAGE-TAKING APPARATUS, INFORMATION PROCESSING APPARATUS, AND IMAGE-TAKING SYSTEM

CROSS REFERENCE TO RELATED APPLICATIONS

This application claims the benefit of Japanese Priority Patent Application JP 2013-237716 filed Nov. 18, 2013, the entire contents of which are incorporated herein by reference.

BACKGROUND

The present technology relates to an image-taking apparatus, an information processing apparatus, an image-taking system, and a program.

In recent years, products called lens-style cameras have been developed. A lens-style camera alone functions as a digital camera. Moreover, a lens-style camera is used in combination with a smartphone. As a result, a user experiences a new flavor of camera (for example see http://www.sony.jp/cyber-shot/qx/).

SUMMARY

Both lens-style cameras and smartphones have various functions necessary to take images. It is desirable to further increase the function of a system, in which a lens-style camera is in combination with a smartphone. It is desirable to provide an image-taking apparatus, an information processing apparatus, an image-taking system, and a program capable of improving an exposure-control function out of image-taking functions.

According to an embodiment of this technology, an image-taking apparatus includes: a detector configured to detect brightness of an object image, and to output internal brightness information; and a controller configured to control exposure based on an exposure value, the exposure value being based on the internal brightness information and external brightness information received from an external apparatus.

According to the embodiment of this technology, the image-taking apparatus controls exposure based on an exposure value, the exposure value being based on brightness information input from outside. As a result, it is possible to control exposure more accurately.

According to an embodiment of this technology, the image-taking apparatus may further include a setting unit configured to select one of a first exposure value and a second exposure value to be used, the first exposure value being based on the internal brightness information, the second exposure value being based on both of the internal brightness information and the external brightness information. The controller may be configured to control exposure based on one of the first exposure value and the second exposure value selected by the setting unit.

According to the image-taking apparatus of the embodiment of this technology, a user is capable of selecting exposure control based on an exposure value, the exposure value being based on brightness information input from outside.

According to the image-taking apparatus of the embodiment of this technology, it is possible for a user to select exposure control based on an exposure value from outside, the exposure value being based on brightness information input from outside.

According to the image-taking apparatus of the embodiment of this technology, the image-taking apparatus may further include an output unit configured to output an image to the external apparatus, the image being taken with exposure controlled by the controller.

According to the image-taking apparatus of the embodiment of this technology, it is possible for a user to confirm an image from outside, exposure of the image being controlled based on an exposure value, the exposure value being based on brightness information input from outside.

According to an embodiment of this technology, the controller may be configured to control exposure based on a first exposure value if the external apparatus does not exist and based on a second exposure value if the external apparatus exists, the first exposure value being based on the internal brightness information, the second exposure value being based on both of the internal brightness information and the external brightness information.

According to an embodiment of this technology, the image-taking apparatus may further include a wireless receiver configured to receive the external brightness information.

According to an embodiment of this technology, the controller may be configured to correct the internal brightness information based on the external brightness information to thereby obtain the exposure value.

According to an embodiment of this technology, the image-taking apparatus may be capable of being fixed to the information processing apparatus.

According to an embodiment of this technology, an information processing apparatus includes: a detector configured to detect brightness of an object image; a determining unit configured to determine if an external image-taking apparatus exists or not; and an output unit configured to output the brightness information to the image-taking apparatus if the image-taking apparatus exists.

According to the information processing apparatus of the embodiment of this technology, brightness information is output to outside. The information processing apparatus is capable of causing an outside apparatus to control exposure based on an exposure value, the exposure value being at least based on the brightness information. As a result, it is possible to control exposure more accurately.

According to the information processing apparatus of the embodiment of this technology, the information processing apparatus may further include a receiver configured to receive an image sent from the image-taking apparatus.

According to the information processing apparatus of the embodiment of this technology, a user is capable of instructing to output brightness information to the outside, and instructing an outside apparatus to control exposure based on an exposure value, the exposure value being at least based on the brightness information.

According to the information processing apparatus of the embodiment of this technology, a user is capable of instructing to output brightness information to the outside, and instructing an outside apparatus to control exposure based on an exposure value, the exposure value being at least based on the brightness information.

According to the information processing apparatus of the embodiment of this technology, it is possible to automatically determine that brightness information is to be output to the outside, and automatically determine that an outside apparatus controls exposure based on an exposure value, the exposure value being at least based on the brightness information.

According to an embodiment of this technology, the information processing apparatus may further include a controller configured to display an image received by the receiver on a display unit.

According to the information processing apparatus of the embodiment of this technology, the information processing apparatus may further include an image-taking unit configured to take an object image. The controller may be configured to display an image obtained by the image-taking unit and an image received by the receiver on the display unit at the same time.

According to the information processing apparatus of the embodiment of this technology, it is possible for a user to confirm an image taken by using the information processing apparatus.

According to the information processing apparatus of the embodiment of this technology, it is possible to control exposure more accurately or just as a user intended.

According to the information processing apparatus of the embodiment of this technology, the output unit may be configured to output the brightness information wirelessly.

According to an embodiment of this technology, an image-taking system includes an information processing apparatus and an image-taking apparatus.

The information processing apparatus includes a detector configured to detect brightness of an object image, and to output external brightness information, a determining unit configured to determine if an external image-taking apparatus exists or not, and an output unit configured to output the external brightness information to the image-taking apparatus if the image-taking apparatus exists. The image-taking apparatus includes a detector configured to detect brightness of an object image, and to output internal brightness information, and a controller configured to control exposure based on an exposure value, the exposure value being based on the internal brightness information detected by the detector and external brightness information received from an external apparatus.

According to the image-taking system of the embodiment of this technology, the image-taking apparatus controls exposure based on an exposure value, the exposure value being based on brightness information input from the information processing apparatus. As a result, it is possible to control exposure more accurately.

According to the embodiment of this technology, brightness information is output to the image-taking apparatus. The information processing apparatus is capable of causing the image-taking apparatus to control exposure based on an exposure value, the exposure value being at least based on the brightness information. As a result, it is possible to control exposure more accurately.

As described above, according to this technology, it is possible to control exposure more accurately. These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.

[Example of External Structure of Image-Taking Apparatus]

Figure 1:
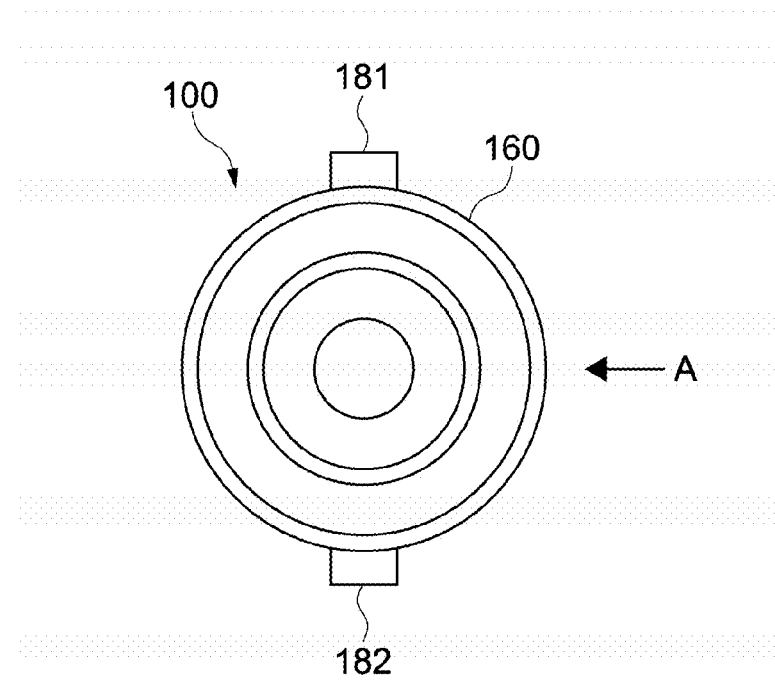
FIG. 1 is a front view showing an image-taking apparatus of an embodiment of this technology.
Figure 2:
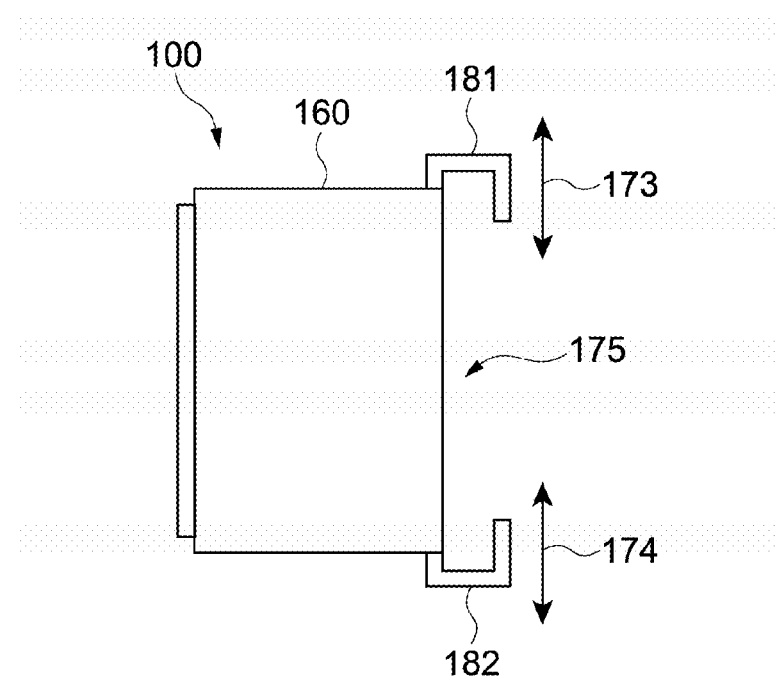
FIG. 2 is a side view showing the image-taking apparatus of FIG. 1.

Each of FIG. 1 and FIG. 2 is a diagram showing the external structure of an image-taking apparatus 100 of an embodiment. FIG. 1 is a front view showing the image-taking apparatus 100. FIG. 2 is a side view showing the image-taking apparatus 100 (side view of image-taking apparatus 100 seen in direction A).

Moreover, in the example of this embodiment, the image-taking apparatus 100 is a cylindrical (columnar) image-taking apparatus. In other words, in this example, the shape of the image-taking apparatus 100 is similar to the shape of a lens unit alone of a general image-taking apparatus (for example, retractable lens type digital still camera). Note that the image-taking apparatus 100 includes operation members such as a zoom lever and a shutter key. However, FIG. 1 and the like do not show them. Specifically, the image-taking apparatus 100 according to the embodiment of this technology includes no display unit such as a liquid-crystal panel configured to display stored images and obtained image.

Figure 3:
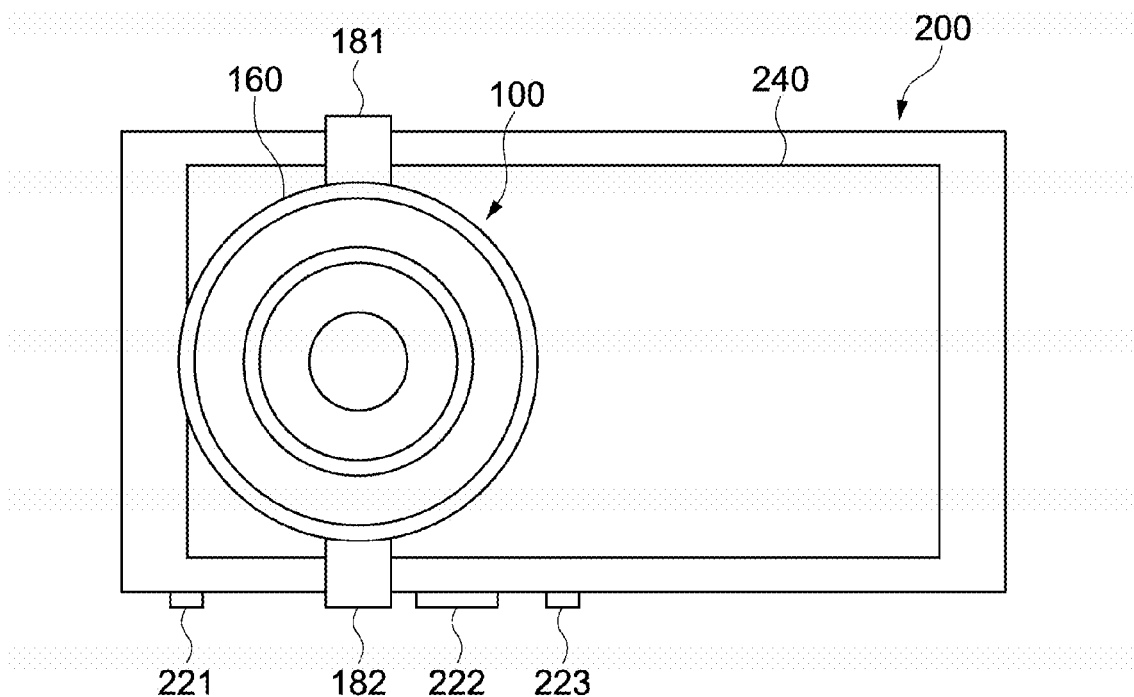
FIG. 3 is a diagram showing an external structure of the image-taking apparatus of the embodiment of this technology attached to the information processing apparatus.
Figure 4:
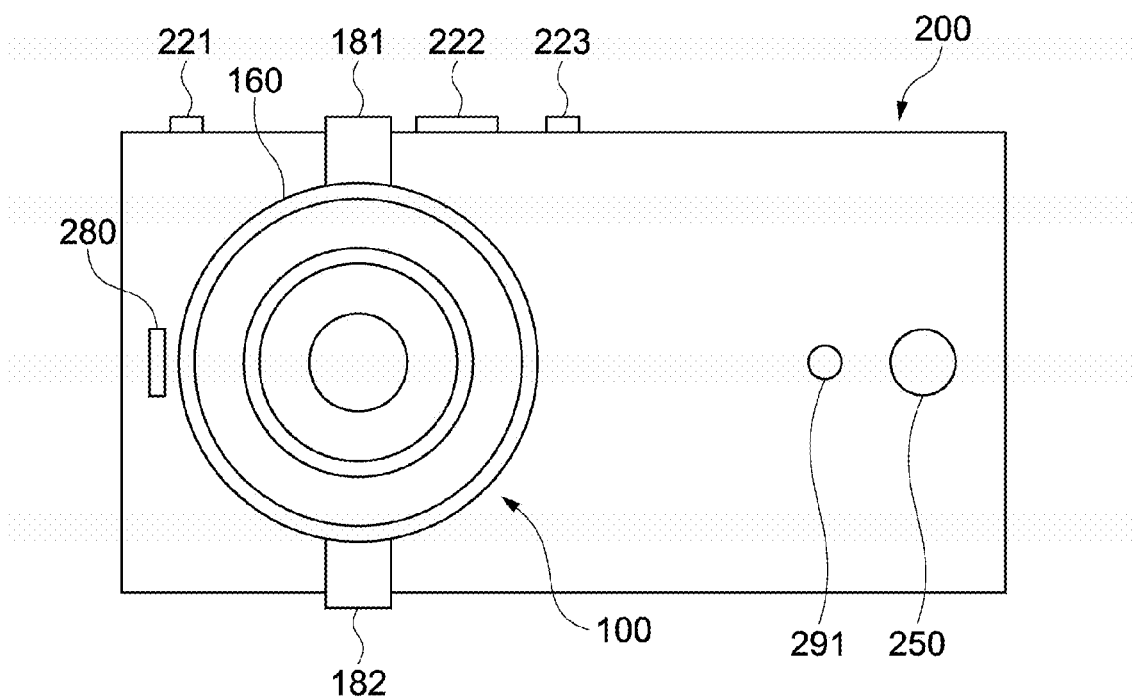
FIG. 4 is a diagram showing another external structure of the image-taking apparatus of the embodiment of this technology attached to the information processing apparatus.
Figure 5:
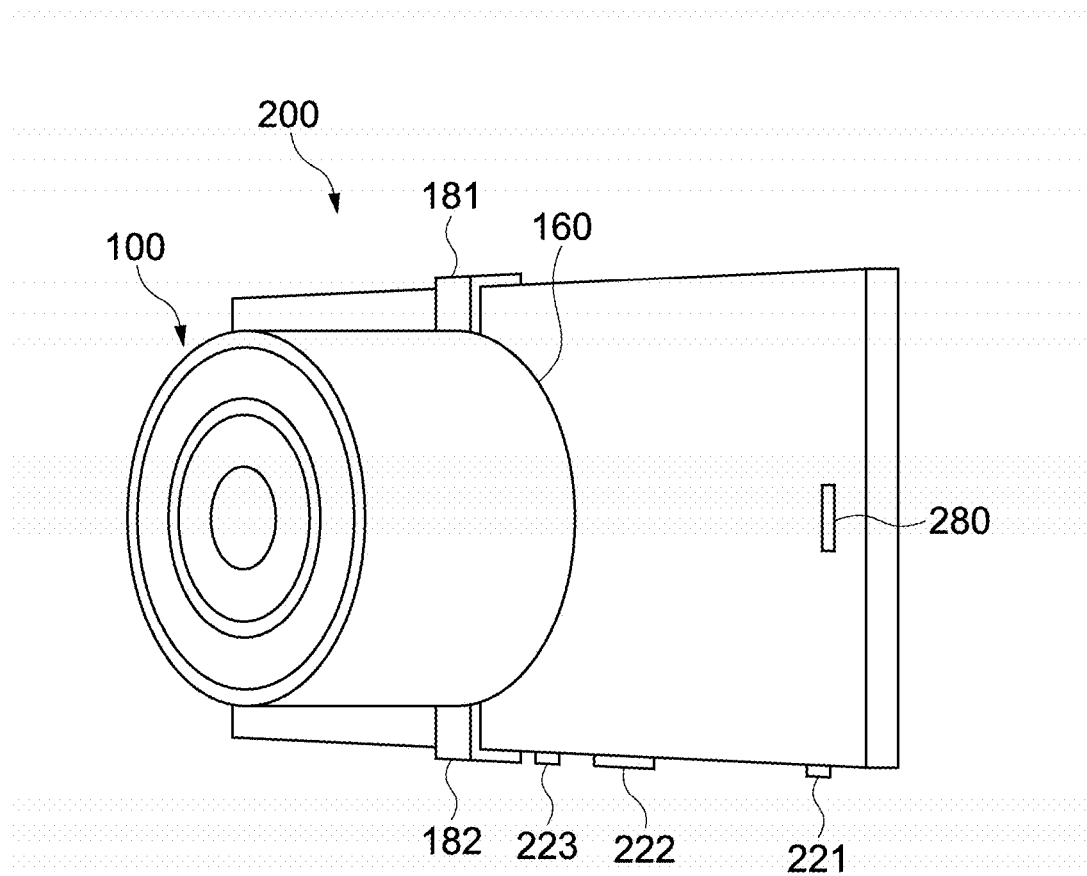
FIG. 5 is a diagram showing another external structure of the image-taking apparatus of the embodiment of this technology attached to the information processing apparatus.

The image-taking apparatus 100 includes a lens tube 160 and attachment tools 181 and 182. The lens tube 160 accommodates the members of an optical system, an image-taking system, and the like. The attachment tools 181 and 182 are attachments, and are used when the image-taking apparatus 100 is attached to an information processing apparatus 200 as shown in FIG. 3 to FIG. 5. For example, the attachment tool 181 is moved in the direction 173 and the attachment tool 182 is moved in the direction 174 depending on the shape and the size of the information processing apparatus 200. As a result, the attachment tools 181 and 182 fix the image-taking apparatus 100 on the information processing apparatus 200. Moreover, an attached surface 175 (surface opposite to surface of lens side of FIG. 1) functions as an attachment surface when the image-taking apparatus 100 is attached to the information processing apparatus 200. Note that in each of FIG. 3 to FIG. 5, the image-taking apparatus 100 is attached to the information processing apparatus 200 as an example.

The image-taking apparatus 100 is capable of taking images independently. Moreover, when the image-taking apparatus 100 is distant from the information processing apparatus 200, the image-taking apparatus 100 is capable of taking images operated by the information processing apparatus 200. The image-taking apparatus 100 is capable of taking images operated by the information processing apparatus 200. The information processing apparatus 200 includes a display unit such as a liquid-crystal panel. The display unit displays stored images and images obtained by the image-taking apparatus 100. A user watches the displayed image and operates the image-taking apparatus 100 at the same time such that it takes an image.

[Example of Way to Attach Image-Taking Apparatus]

Each of FIG. 3 to FIG. 5 is a diagram showing an external structure of the image-taking apparatus 100 of this embodiment attached to the information processing apparatus 200.

FIG. 3 shows the image-taking apparatus 100 attached to one surface (surface on which input/output unit 240 is provided) of the information processing apparatus 200 as an example. FIG. 4 shows the image-taking apparatus 100 attached to the other surface (surface opposite to surface on which input/output unit 240 is provided) of the information processing apparatus 200 as an example. FIG. 5 shows the image-taking apparatus 100 attached to the other surface (surface opposite to surface on which input/output unit 240 is provided) of the information processing apparatus 200 as another example. For example, the information processing apparatus 200 is a smartphone, a tablet terminal, or the like.

The information processing apparatus 200 includes operation members 221 to 223, the input/output unit 240, an audio output unit 280, a light emitter 291, and an image-taking unit 250.

The operation members 221 to 223 are used when a user inputs various kinds of operation.

The input/output unit 240 displays various images. The input/output unit 240 detects something coming close to or coming in contact with the display surface of the input/output unit 240, and receives operations input by a user based on the detected status.

The audio output unit 280 is configured to output various kinds of audio information.

The light emitter 291 is a light-emitting device configured to emit light to an object. The light emitter 291 is used when the information processing apparatus 200 takes an image under an environment of insufficient brightness such as nighttime or an indoor environment for example.

The image-taking unit 250 is configured to take an object image, and to create an image (image data).

As shown in FIG. 3 to FIG. 5, the attachment tools 181 and 182 of the image-taking apparatus 100 hold the body of the information processing apparatus 200. As a result, the image-taking apparatus 100 is fixed to the information processing apparatus 200.

[Configuration of Image-Taking Apparatus and Configuration of Information Processing Apparatus]

Figure 6:
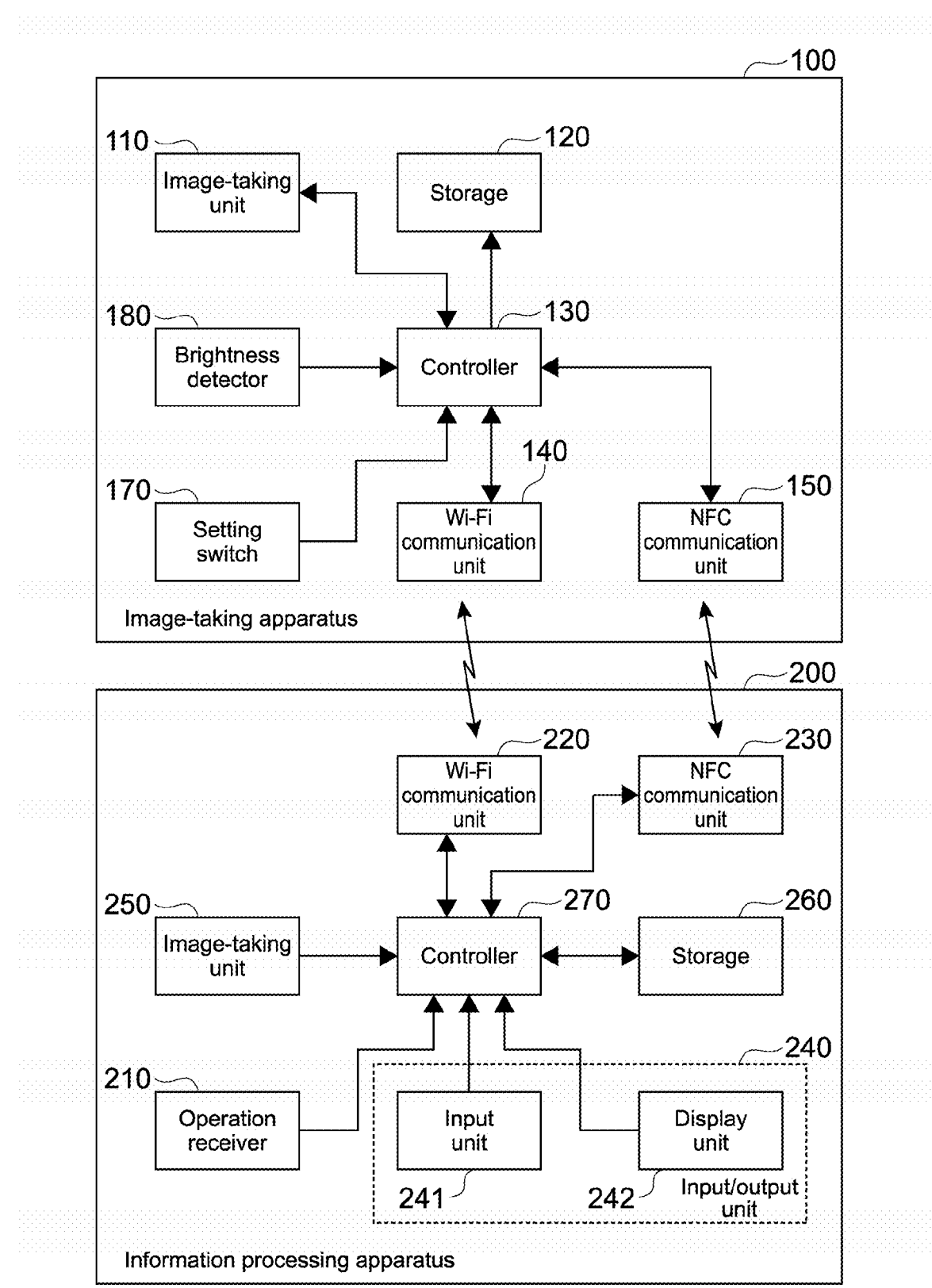
FIG. 6 is a block diagram showing the configuration of the image-taking apparatus and the configuration of the information processing apparatus of the embodiment of this technology.

FIG. 6 is a block diagram showing the configuration of the image-taking apparatus 100 and the configuration of the information processing apparatus 200 of this embodiment.

(Configuration of Image-Taking Apparatus 100)

The image-taking apparatus 100 includes an image-taking unit 110, storage 120, a controller 130, a Wi-Fi communication unit 140, a NFC communication unit 150, a brightness detector 180, and a setting switch 170.

The image-taking unit 110 is configured to take an object image of an object, and to create an image (image data). The image-taking unit 110 includes, for example, an optical system (plurality of lenses) and an image sensor. Moreover, the controller 130 controls the image-taking unit 110. Specifically, the controller 130 controls the members (for example, zoom lens, focus lens, and diaphragm) of the image-taking unit 110.

The storage 120 stores an image output from the image-taking unit 110. Note that the Wi-Fi communication unit 140 may send the image to the information processing apparatus 200 side, and the information processing apparatus 200 side may store the image. The storage 120 is a recording medium configured to store images of content (for example, still-image file, motion-image file). Note that the image-taking apparatus 100 may include built-in storage 120, or the storage 120 may be removable.

The controller 130 is configured to control the blocks of the image-taking apparatus 100 based on controller programs. For example, the controller 130 is configured to control the blocks based on input operations received by operation members (not shown) of the image-taking apparatus 100 such as a zoom lever and a shutter key and by the setting switch 170. The controller 130 receives control information from the information processing apparatus 200 via the Wi-Fi communication unit 140. The controller 130 controls the blocks based on the control information. In other words, the information processing apparatus 200 is capable of controlling the image-taking apparatus 100 remotely. The Wi-Fi communication unit 140 sends/receives various kinds of information (for example, control data and image data) to/from the information processing apparatus 200 via wireless communication.

The information processing apparatus 200 sends brightness information (external brightness information) corresponding to brightness of an object image of the information processing apparatus 200 side. The controller 130 receives the brightness information via the Wi-Fi communication unit 140. In this embodiment, the controller 130 and the Wi-Fi communication unit 140 function as a receiver.

The controller 130 obtains brightness information (internal brightness information) from the brightness detector 180. The controller 130 calculates an exposure value based on the brightness information (internal brightness information) and the brightness information (external brightness information) corresponding to the brightness of the object image of the information processing apparatus 200 side. The controller 130 controls exposure based on the exposure value.

In this embodiment, Wi-Fi (Wireless Fidelity) is used for wireless communication. Alternatively, for example, wireless communication such as Bluetooth (registered trademark), infrared, or radio waves for mobile phones may be used.

The NFC communication unit 150 detects that the image-taking apparatus 100 comes close to the information processing apparatus 200 via NFC (Near Field Communication). Moreover, the NFC communication unit 150 detects if the image-taking apparatus 100 is attached to the information processing apparatus 200. Wireless communication is started as follows. The NFC communication unit 150 determines that the information processing apparatus 200 is near or attached to the image-taking apparatus 100. Then, the image-taking apparatus 100 is powered on. After that, the image-taking apparatus 100 sends/receives data to/from the information processing apparatus 200 via the Wi-Fi communication unit 140. Note that, instead of the NFC communication unit 150, for example, a button, which is configured to mechanically detect attachment of the information processing apparatus 200, may be provided and may detect the attached status.

The brightness detector 180 detects brightness of an object image. A photometric sensor may be used as the brightness detector 180. Alternatively, brightness may be detected based on information from the image-taking unit 110.

The setting switch 170 selects one of: to control exposure based on an exposure value corresponding to brightness information detected by the brightness detector 180; and to control exposure based on an exposure value, which is obtained by the information processing apparatus 200 by correcting brightness information detected by the brightness detector 180. For example, a slidable switch is provided on the lens tube 160, whereby the setting switch 170 is realized. The controller 130 controls exposure based on the exposure value calculated as described above depending on selection by the setting switch 170.

(Configuration of Information Processing Apparatus 200)

The information processing apparatus 200 includes an operation receiver 210, a Wi-Fi communication unit 220, an NFC communication unit 230, the input/output unit 240, the image-taking unit 250, storage 260, and a controller 270.

The operation receiver 210 is an operation receiver, and receives operations by a user. The operation receiver 210 outputs control information (operation information) to the controller 270 depending on the received operation. The operation receiver 210 corresponds to the operation members 221 to 223 of FIG. 3 to FIG. 5, for example.

The Wi-Fi communication unit 220 sends/receives various kinds of information (for example, control data and image data) to/from the image-taking apparatus 100 via wireless communication.

The NFC communication unit 230 detects that the image-taking apparatus 100 comes close to the information processing apparatus 200. Moreover, the NFC communication unit 230 detects if the image-taking apparatus 100 is attached to the information processing apparatus 200 or not.

Wireless communication is started as follows. The NFC communication unit 230 determines that the image-taking apparatus 100 is near or attached to the information processing apparatus 200. Then, an image-taking application of the information processing apparatus 200 is started. After the image-taking application is started, the image-taking apparatus 100 sends/receives data to/from the Wi-Fi communication unit 220 of the information processing apparatus 200 via Wi-Fi communication.

The input/output unit 240 includes an input unit 241 and a display unit 242. Controlled by the controller 270, the input/output unit 240 displays various images on the display unit 242. In addition, a user inputs operations in various image-taking operation members displayed on the display unit 242. The input unit 241 of the input/output unit 240 receives the operations. Examples of the image-taking operation members include a zoom bar, a shutter key, and the like. Moreover, the input unit 241 outputs control information to the controller 270 depending on the input operation received by the input unit 241.

For example, an electrostatic (electrostatic capacitive) touchscreen may be used as the input unit 241. The electrostatic (electrostatic capacitive) touchscreen is configured to detect that an electrostatic capacity is changed, and to detect that something conductive (for example, finger of person) comes in contact with or comes close to the touchscreen based thereon. Moreover, for example, a display panel such as an LCD (Liquid-crystal Display) or an organic EL (electro luminescence) panel may be used as the display unit 242. Moreover, for example, a transparent touchscreen is layered on the display surface of a display panel, whereby the input/output unit 240 is structured.

The image-taking unit 250 takes an object image, and creates an image (image data). The image-taking unit 250 includes, for example, an optical system and an image sensor. Moreover, the controller 270 controls the members (for example, focus lens and diaphragm) of the image-taking unit 250.

The image-taking unit 250 outputs an image, and the storage 260 stores the image. Note that the storage 260 may store an image sent from the image-taking apparatus 100 side.

The storage 260 is a recording medium configured to store images of content (for example, still-image file, motion-image file). Note that the information processing apparatus 200 may include built-in storage 260, or the storage 260 may be removable.

The controller 270 is configured to control the blocks of the information processing apparatus 200 based on controller programs. For example, when the information processing apparatus 200 connects to the image-taking apparatus 100, the controller 270 displays a display window on the input/output unit 240. A user operates the display window to control the image-taking apparatus 100. The controller 270 is configured to detect brightness based on information from the image-taking unit 250. In this embodiment, the image-taking unit 250 and the controller 270 function as a detector configured to detect brightness. Alternatively, a detector configured to detect brightness may be provided independent of the image-taking unit 250.

The controller 270 is capable of sending brightness information depending on the detected brightness to the image-taking apparatus 100 via the Wi-Fi communication unit 220. The controller 270 is capable of receiving setting information from the image-taking apparatus 100 via the Wi-Fi communication unit 220. The setting information means that the brightness information is to be output to the image-taking apparatus 100 side. The controller 270 receives the setting information, and then sends brightness information to the image-taking apparatus 100 via the Wi-Fi communication unit 220. In this embodiment, the controller 270 and the Wi-Fi communication unit 220 function as a receiver and an output unit.

[Behaviors of Image-Taking Apparatus and Information Processing Apparatus]

Next, behaviors of the image-taking apparatus 100 and the information processing apparatus 200 of this embodiment will be described.

Figure 7:
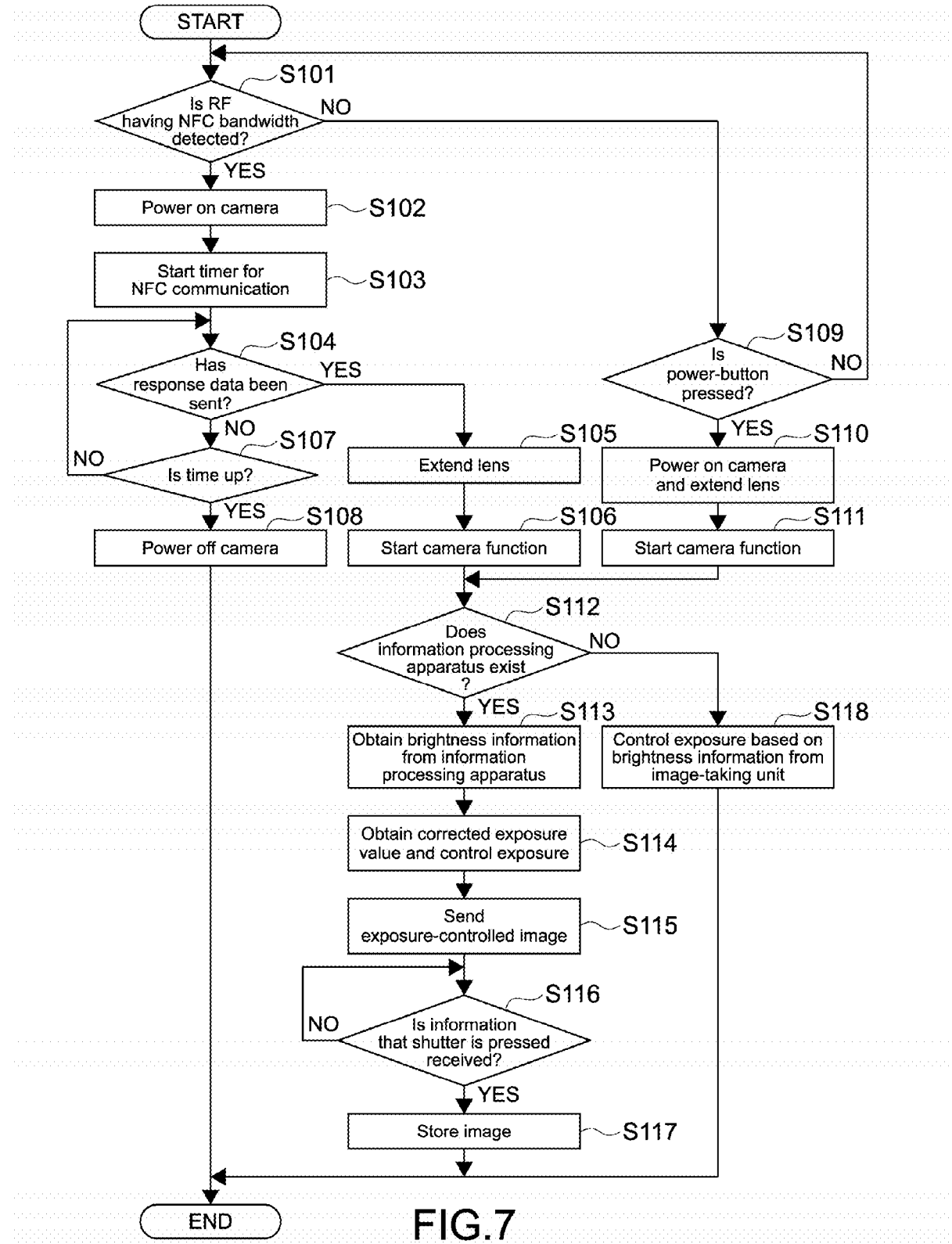
FIG. 7 is a flowchart showing behaviors of the image-taking apparatus of the embodiment of this technology.

FIG. 7 is a flowchart showing behaviors of the image-taking apparatus 100 of this embodiment. As shown in FIG. 7, firstly, in Step S101, the NFC communication unit 150 detects an RF signal (wireless signal) having the NFC bandwidth from outside. The wireless signal corresponds to a polling command sent from the information processing apparatus 200. A detector of the NFC communication unit 150, which is configured to detect the frequency of a wireless signal having the NFC bandwidth, is capable of detecting the wireless signal. So the command is not decoded at this time. The NFC communication unit 150 recognizes that an RF signal having the NFC bandwidth is detected.

Next, if a wireless signal having the NFC bandwidth is detected (S101/Yes), in Step S102, the controller 130 outputs a power control signal to a power source (not shown). The power control signal instructs to power on the powered-off image-taking apparatus 100. At this time, the controller 130 does not execute an image-taking preparation behavior. An example of the image-taking preparation behavior is to extend a retractable lens of the image-taking unit 110.

Next, in Step S103, the controller 130 starts a timer for NFC communication.

Next, in Step S104, the controller 130 determines if response data has been sent or not via NFC communication depending on a check command from outside. The response data sent via NFC communication depending on a check command includes Wi-Fi Config and AAR (Android Application Record).

Next, if response data has been sent (S104/Yes), in Step S105, the controller 130 executes the image-taking preparation behavior. An example of the image-taking preparation behavior is to extend a retractable lens of the image-taking unit 110.

Next, in Step S106, the controller 130 starts a camera function. For example, the controller 130 converts an object image, which is formed by the optical system including the retractable lens, into an electric image signal. Moreover, the controller 130 establishes Wi-Fi connection with the information processing apparatus 200, and executes a link-function with the information processing apparatus 200. Note that, if response data has not been sent (S104/No) and a time period (predetermined time period) set for the timer has passed (S107/Yes), in Step S108, the controller 130 outputs a power control signal to the power source (not shown). The power control signal instructs to power off the image-taking apparatus 100. Moreover, if an RF signal (wireless signal) has not been detected and a power-button of the image-taking apparatus 100 is pressed (Step S109/Yes), the controller 130 outputs a power control signal to the power source (not shown). The power control signal instructs to power on the power-off image-taking apparatus 100. At this time, the controller 130 executes the image-taking preparation behavior. An example of the image-taking preparation behavior is to extend a retractable lens of the image-taking unit 110 (Step S110). The controller 130 starts the above-mentioned camera function (Step S111).

Figure 8:
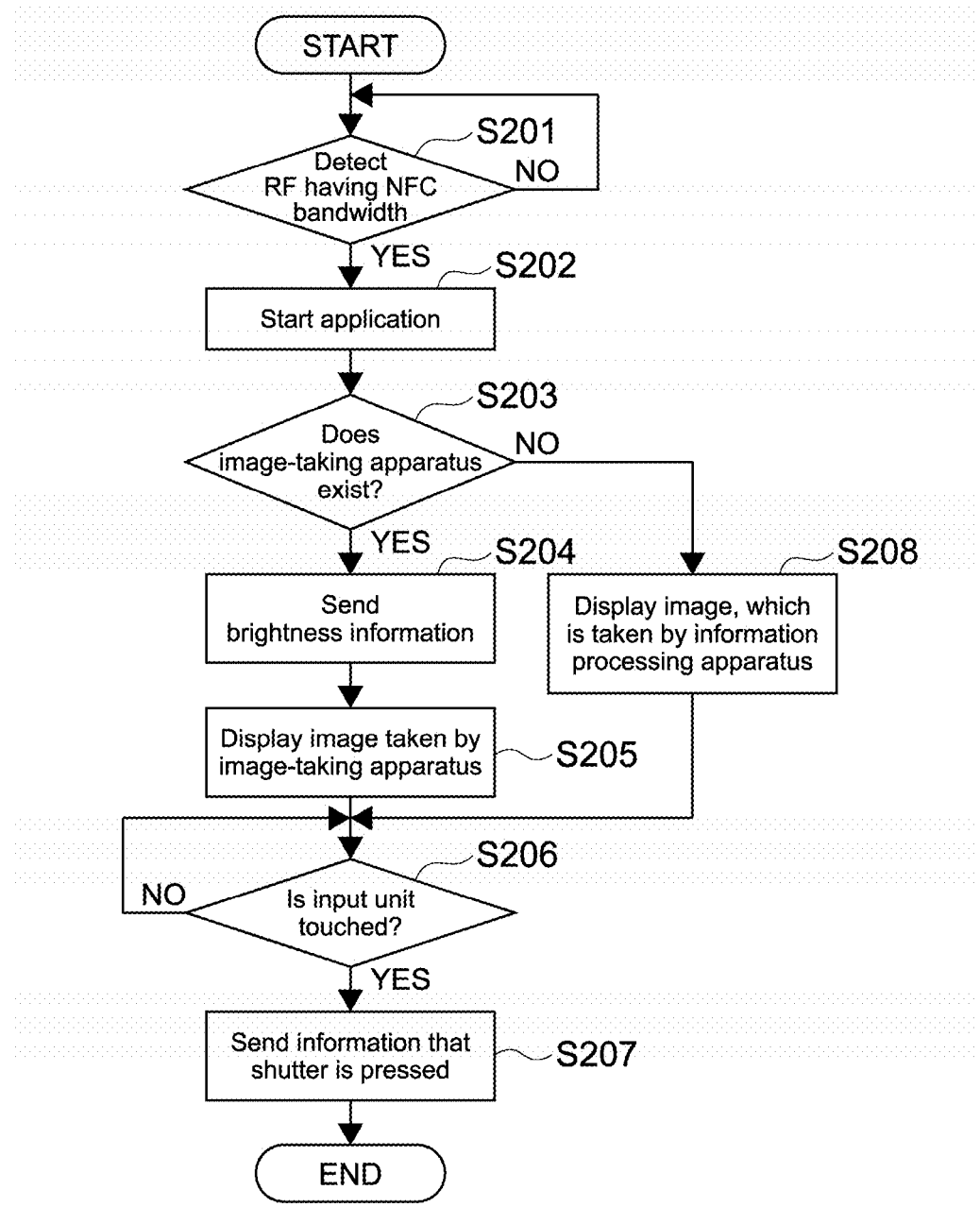
FIG. 8 is a flowchart showing the behavior of the information processing apparatus of the embodiment of this technology.

Here, FIG. 8 is a flowchart showing the behavior of the information processing apparatus 200. The NFC communication unit 230 at the information processing apparatus 200 side detects RF (wireless signal) having the NFC bandwidth from the image-taking apparatus 100 (Step S201). Then the NFC communication unit 230 starts a predetermined application in accordance with AAR (Step S202). Then the NFC communication unit 230 sends a Wi-Fi connection request to the image-taking apparatus 100 by using Wi-Fi Config. Then Wi-Fi connection is established between the information processing apparatus 200 and the image-taking apparatus 100. Then link-function using Wi-Fi communication is executed.

The information processing apparatus 200 executes the above-mentioned predetermined application, i.e., the application for link-function, as shown in the following steps.

Firstly, the controller 270 sends/receives predetermined data via Wi-Fi communication, and determines if the linked image-taking apparatus 100 exists or not (Step S203).

Figure 9:
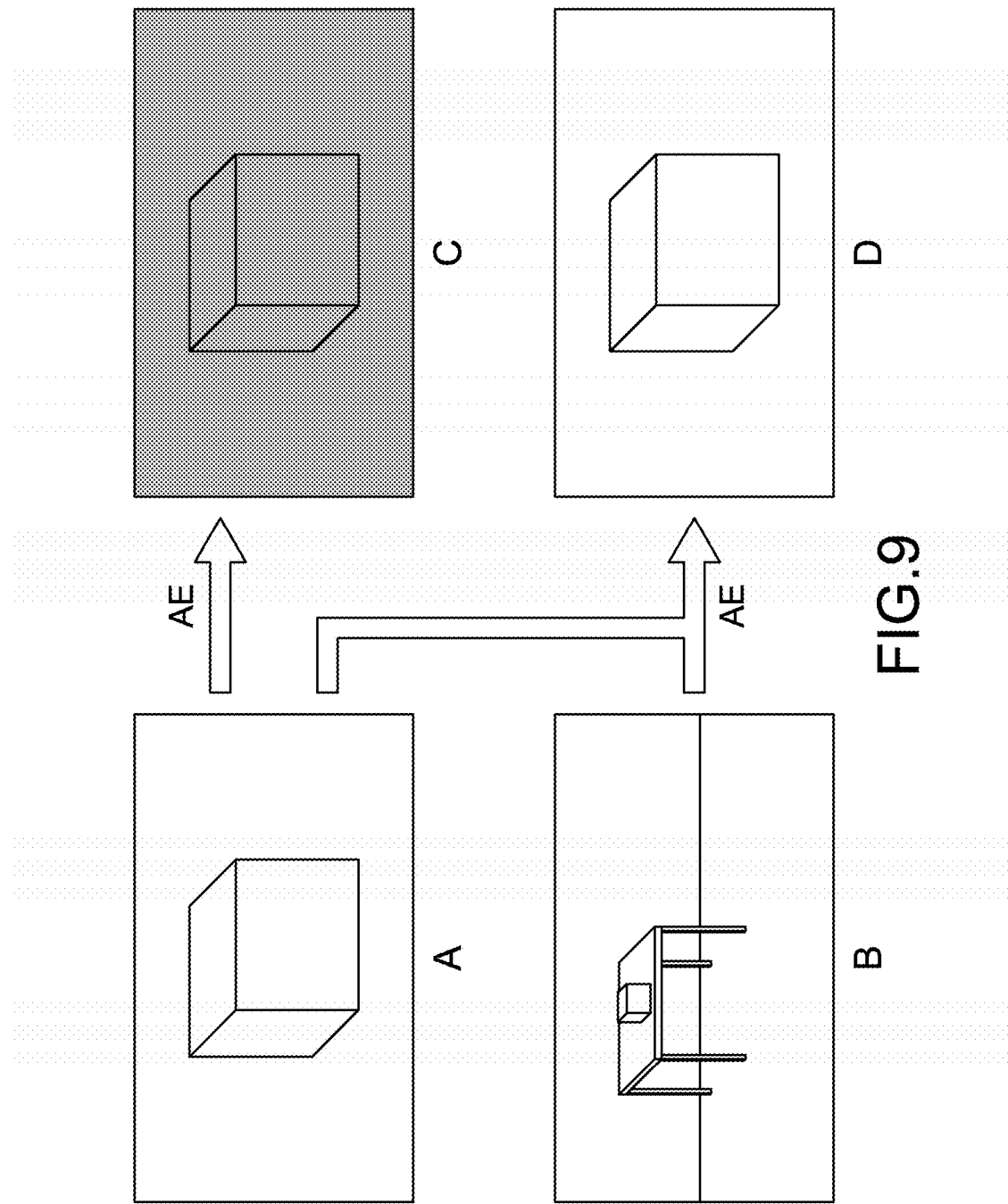
FIG. 9 is a diagram illustrating effects of the system of the embodiment of this technology.

In Step S203, if the image-taking apparatus 100 exists, for example, the controller 270 sends the brightness information on the image of "B" of FIG. 9, which is obtained by the image-taking unit 250, to the image-taking apparatus 100 side via Wi-Fi communication (Step S204).

Meanwhile, with reference to FIG. 7 again, the image-taking apparatus 100 links to the information processing apparatus 200. Firstly, the controller 130 of the image-taking apparatus 100 sends/receives predetermined data via Wi-Fi communication, and determines if the linked information processing apparatus 200 exists or not (Step S112).

Meanwhile, if the controller 130 determines that the information processing apparatus 200 exists in Step S112, the controller 130 obtains the above-mentioned brightness information on the image (see "B" of FIG. 9), which is sent from the information processing apparatus 200, via Wi-Fi communication (Step S113).

The controller 130 corrects the brightness information on the image (see "A" of FIG. 9) taken by the image-taking unit 110, which is obtained by the brightness detector 180, based on brightness information on the image (see "B" of FIG. 9) at the information processing apparatus 200 side, whereby an exposure value is obtained. The controller 130 controls exposure based on the exposure value (Step S114). The exposure-controlled image (see "D" of FIG. 9) is sent to the information processing apparatus 200 side via Wi-Fi communication (Step S115).

Here, with reference to FIG. 8 again, the link-function application of the information processing apparatus 200 displays the above-mentioned image (see "D" of FIG. 9), which is taken by the image-taking apparatus 100, on the display unit 242 (Step S205). If the input unit 241 is touched when the image (see "B" of FIG. 9) is displayed (Step S206), the information processing apparatus 200 sends information that the shutter is pressed to the image-taking apparatus 100 side via Wi-Fi communication (Step S207). Moreover, if an image-taking apparatus does not exist (Step S203), the information processing apparatus 200 displays an image taken by the information processing apparatus 200 (Step S208)

With reference to FIG. 7 again, the controller 130 of the image-taking apparatus 100 receives the information that the shutter is pressed from the information processing apparatus 200 side via Wi-Fi communication (Step S116). Then the controller 130 stores the exposure-controlled image (e.g., still image) in the storage 120 (Step S117). In this example, a still image is stored. Alternatively, a motion image is stored similarly.

Note that if the controller 130 does not determine that the information processing apparatus 200 exists (Step S112/No), the controller 130 obtains an exposure value based on the brightness information on the image (see "A" of FIG. 9)

taken by the image-taking unit 110. The controller 130 controls exposure based on the exposure value (Step S118).

As described above, in this embodiment, the image-taking apparatus 100 such as a lens-style camera links with the information processing apparatus 200 such as a smartphone. In such a system, the exposure-control accuracy may be increased by using brightness information obtained by the image-taking apparatus 100 and brightness information obtained by the information processing apparatus 200. For example, brightness information on an image of a wide angle of view of the information processing apparatus 200 when the information processing apparatus 200 gets an overview of a close-up picture is used as additional information for automatic exposure when the image-taking apparatus 100 takes a picture close up (macro photography).

Figure 10:
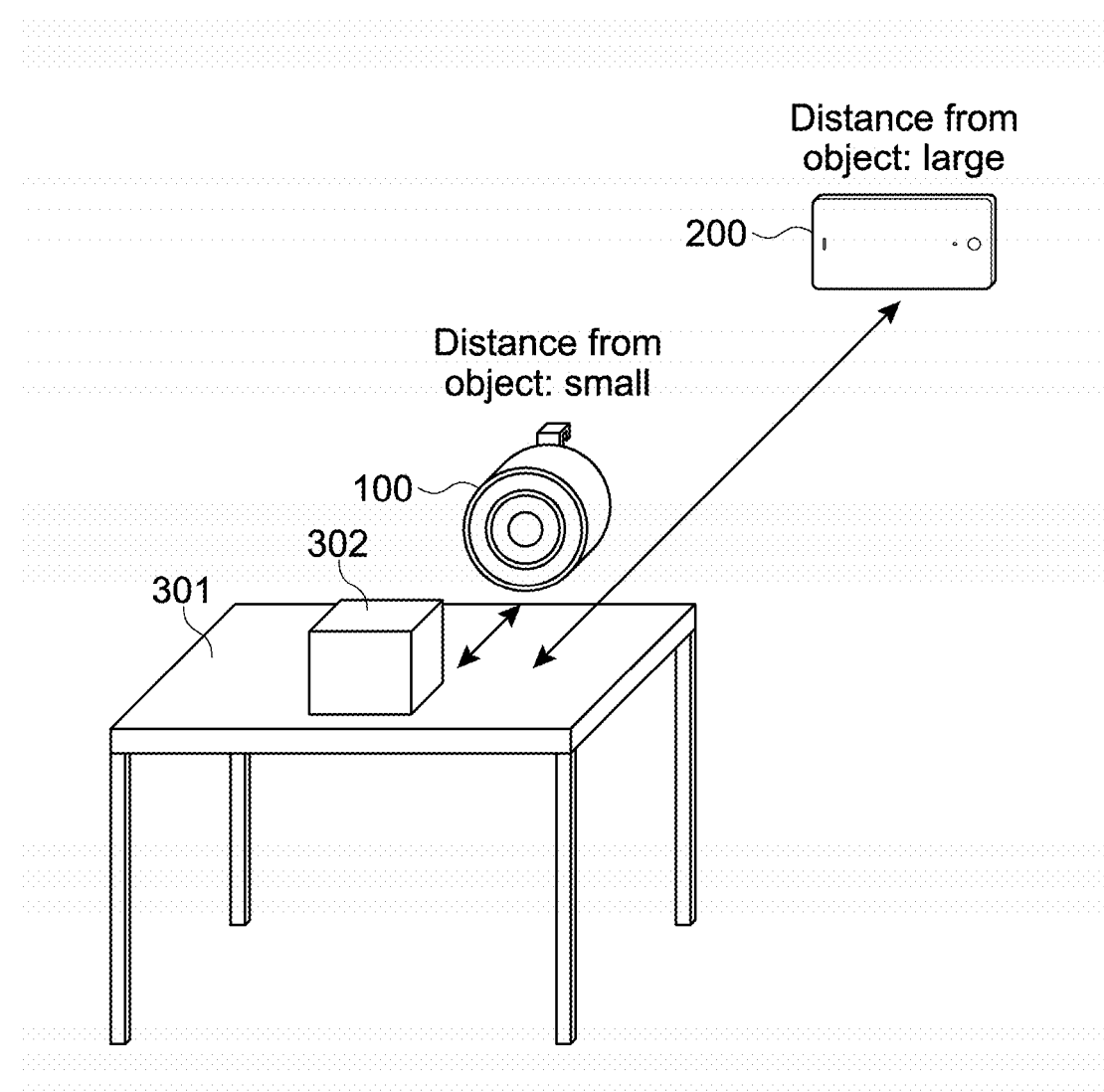
FIG. 10 is another diagram illustrating effects of the system.

For example, as shown in FIG. 10, an object 302 is on a white table 301. A user tries to take a picture of the object 302 close up by using the image-taking apparatus 100. Then as shown in "A" of FIG. 9, since the image-taking apparatus 100 is close to the object 302, if a picture is taken in the angle of view of the image-taking apparatus 100, the background of the picture only contains the white table 301. In this case, under the normal exposure control, if the background is white, the entire image is darkened as shown in "C" of FIG. 9. If an image is taken as it is, a dark image may be obtained.

To the contrary, because the information processing apparatus 200 is distant from the object 302 as shown in "B" of FIG. 9, an image of the entire image-taking environment may be taken in the angle of view of the information processing apparatus 200.

As described above, brightness information on an image of a wide angle of view of the information processing apparatus 200 is used as additional information for automatic exposure when the image-taking apparatus 100 takes a picture close up. As a result, in this case, the information processing apparatus 200 informs the image-taking apparatus 100 that the background of the close-up image taken by the image-taking apparatus 100 is dark. As a result, as shown in "D" of FIG. 9, the exposure of the image-taking apparatus 100 is controlled appropriately, and the image is not darkened.

Other Embodiments

This technology is applicable to a wider technical field, and includes other various embodiments. Hereinafter, such embodiments will be disclosed.

Example 1 of Selection of Apparatus

Figure 11:
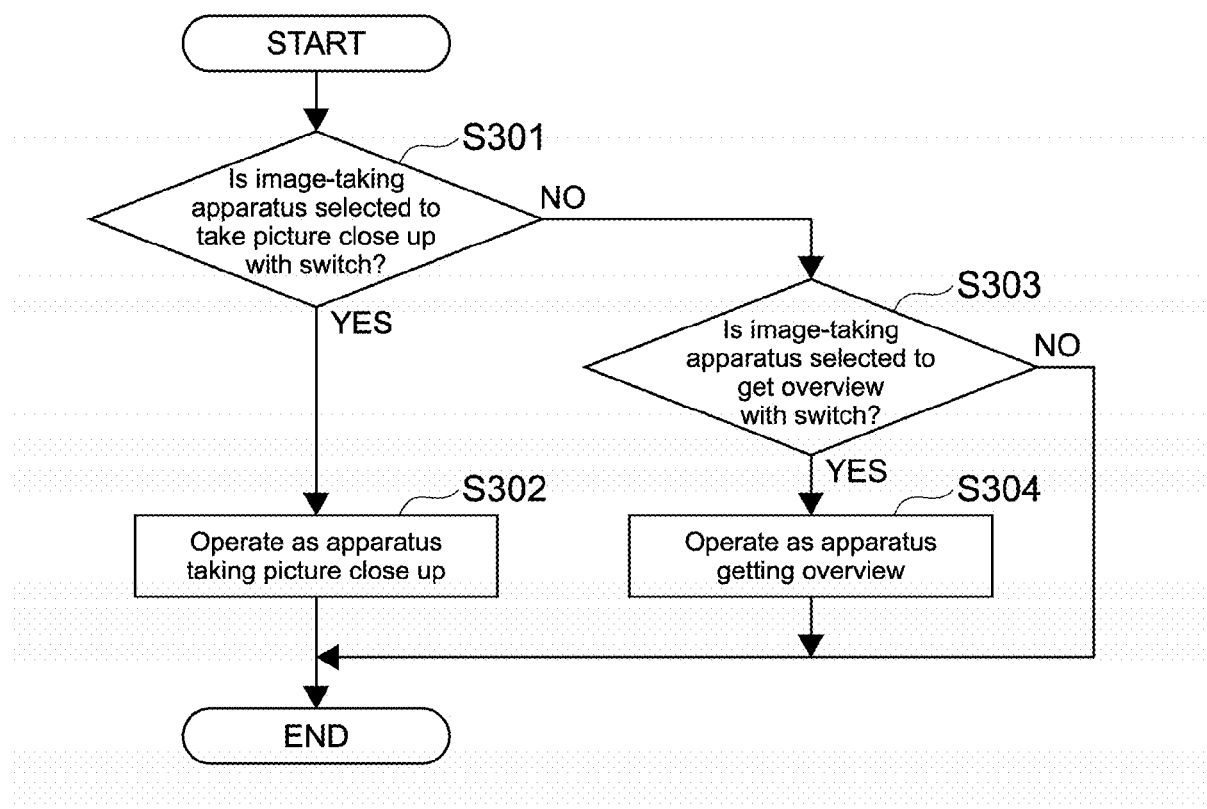
FIG. 11 is a flowchart showing behaviors of the image-taking apparatus according to another embodiment of this technology.

FIG. 11 is a flowchart showing behaviors of the image-taking apparatus 100 according to another embodiment.

The first embodiment is based on the fact that the image-taking apparatus 100 takes a picture close up and that the information processing apparatus 200 gets an overview. However, in the following embodiment, a user may select one of the image-taking apparatus 100 and the information processing apparatus 200 as an apparatus, which takes a picture close up.

Figure 12:
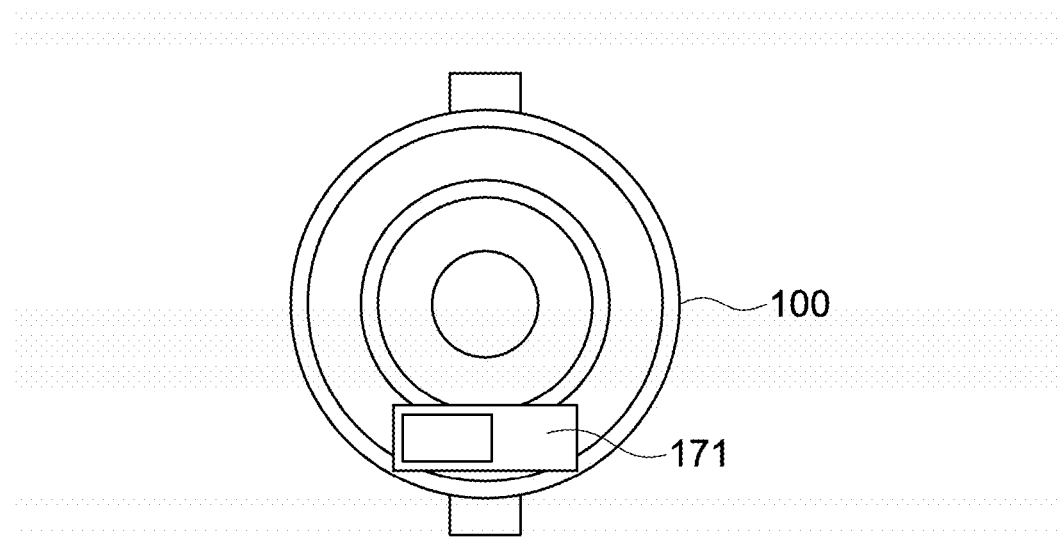
FIG. 12 is a diagram showing an example of the structure of the image-taking apparatus of the embodiment of FIG. 11.

As shown in FIG. 12, for example, the image-taking apparatus 100 includes a switch 171. In Step S301, if the image-taking apparatus 100 is selected to take a picture close up with the switch 171, the image-taking apparatus 100 operates as an apparatus taking a picture close up and the information processing apparatus 200 operates as an apparatus getting an overview (Step S302).

Meanwhile, in Step S303, if the information processing apparatus 200 is selected to take a picture close up with the switch 171, the information processing apparatus 200 operates as an apparatus taking a picture close up and the image-taking apparatus 100 operates as an apparatus getting an overview (Step S304). In this case, the image-taking apparatus 100 sends brightness information to the information processing apparatus 200 side. The information processing apparatus 200 corrects brightness information obtained by the information processing apparatus 200 based on the brightness information sent from the image-taking apparatus 100, to thereby obtain an exposure value. The information processing apparatus 200 controls exposure based on the exposure value.

Because of this, a user is capable of selecting an apparatus, which takes a picture close up. In addition, it is possible to control exposure more accurately.

Figure 13:
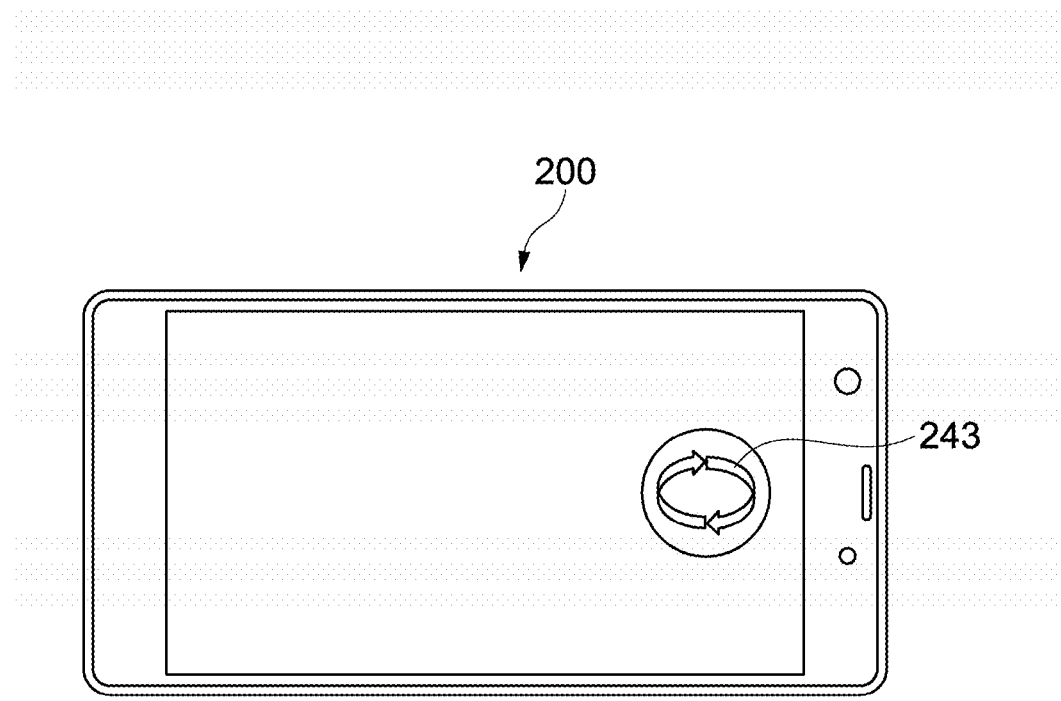
FIG. 13 is a diagram showing another example of the structure of the image-taking apparatus of the embodiment of FIG. 11.

Note that not the image-taking apparatus 100 but the information processing apparatus 200 may include this kind of switch. FIG. 13 shows an example. The display unit 242 of the information processing apparatus 200 displays a toggle UI button 243. A user may select an apparatus, which takes a picture close up, by touching the button 243.

Example 2 Selection of Apparatus

Figure 14:
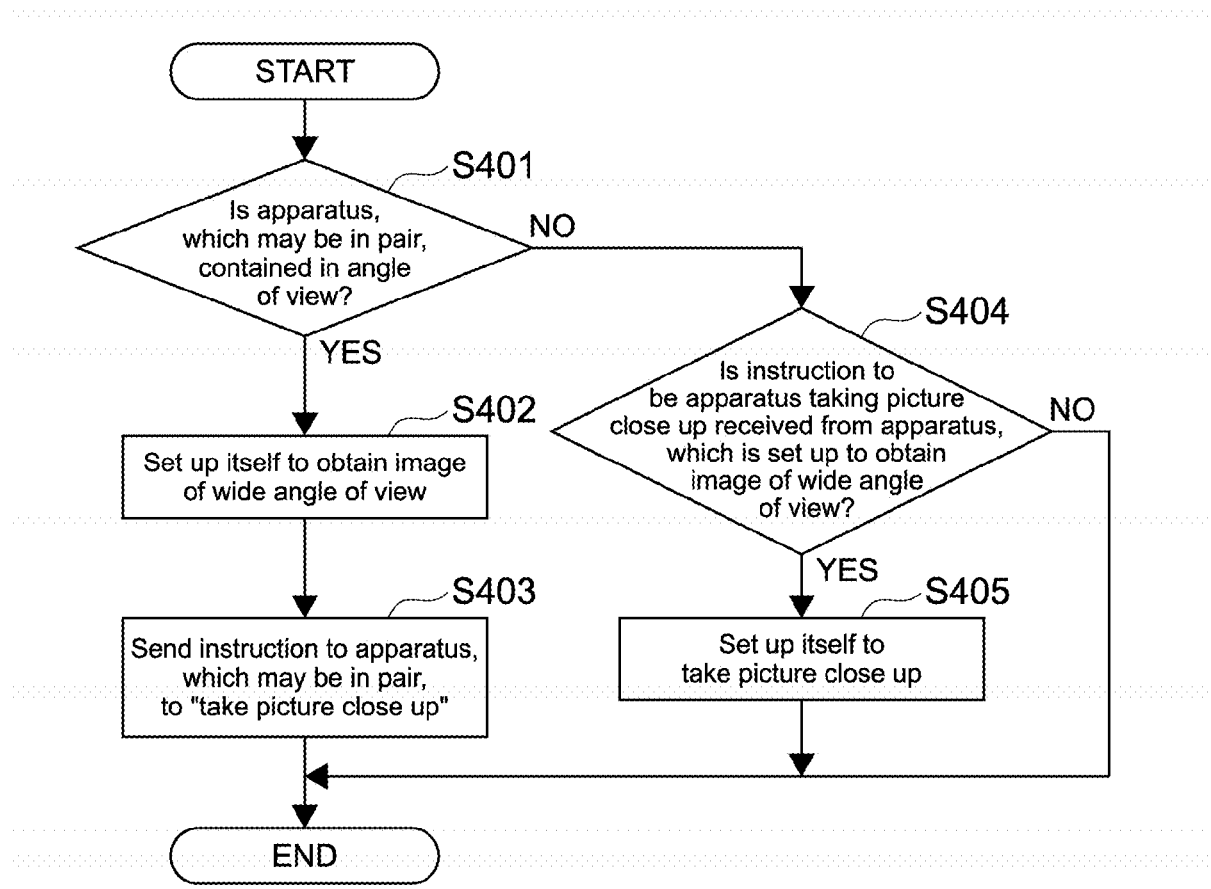
FIG. 14 is a flowchart showing behaviors of the information processing apparatus according to another embodiment of this technology.

FIG. 14 is a flowchart showing behaviors of the information processing apparatus 200 according to another embodiment.

Figure 15:
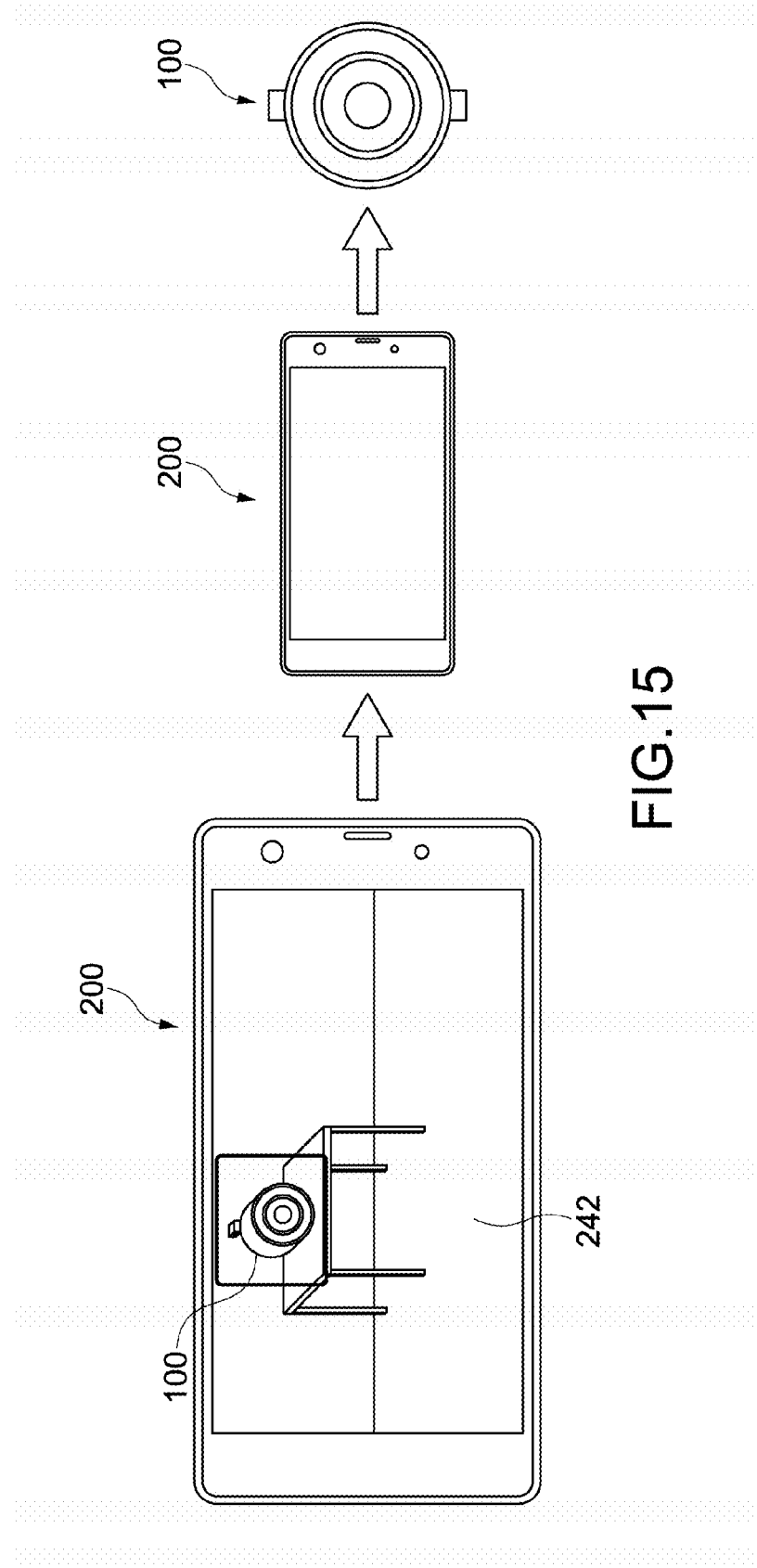
FIG. 15 is a diagram illustrating the behaviors of the embodiment of FIG. 14.

In this embodiment, as shown in FIG. 15, the image-taking apparatus 100 in a pair is contained in the angle of view of the information processing apparatus 200. The information processing apparatus 200 is selected to obtain an image of a wide angle of view. The information processing apparatus 200 sends an instruction to the image-taking apparatus 100 to take a picture close up via Wi-Fi communication.

For example, as shown in FIG. 14, in Step S401, the information processing apparatus 200 processes an image, and determines if the image-taking apparatus 100, which may be in a pair, is contained in the angle of view of an image taken by the information processing apparatus 200 or not.

If the image-taking apparatus 100 is contained in Step S401, the information processing apparatus 200 sets up itself to obtain an image of a wide angle of view (Step S402), and sends an instruction to the image-taking apparatus 100 to take a picture close up (Step S403).

Meanwhile, if the image-taking apparatus 100 is not contained in Step S401, the information processing apparatus 200 determines whether it receives an instruction to be an apparatus taking a picture close up or not from an apparatus. Specifically, the information processing apparatus 200 determines whether it receives an instruction to be an apparatus taking a picture close up from an apparatus, which is set up to obtain an image of a wide angle of view (Step S404). If the image-taking apparatus 100 receives the instruction to be an apparatus taking a picture close up in Step S404, then the information processing apparatus 200 sets up itself to take a picture close up (Step S405).

(Examples of User Interface)

Next, examples of user interfaces of the information processing apparatus 200 of this technology will be described.

Figure 16:
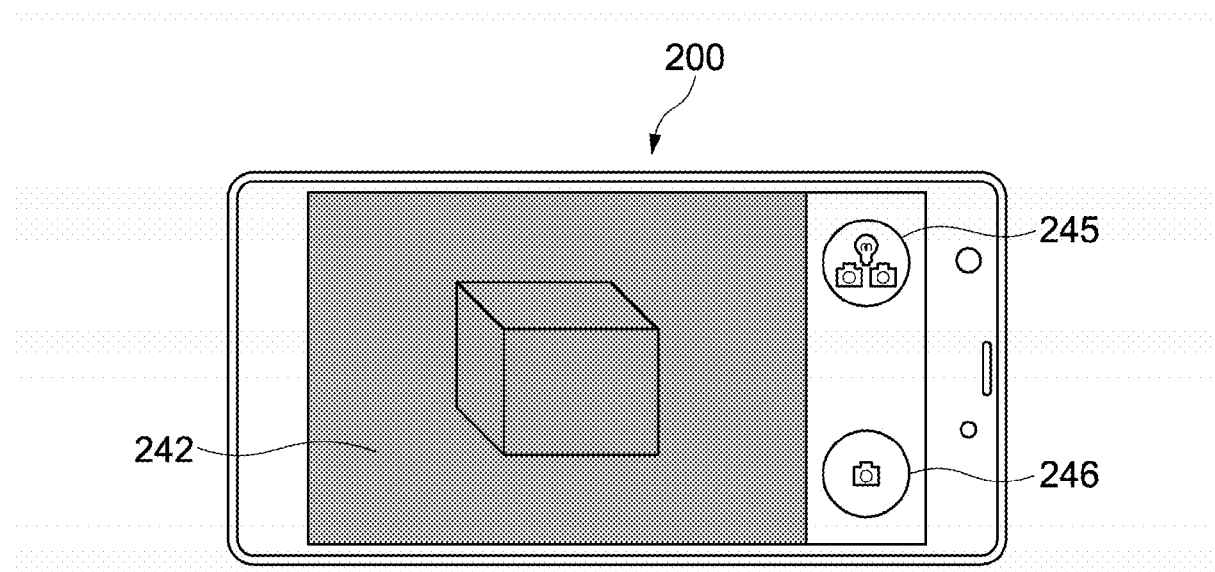
FIG. 16 is a first diagram showing a display window displayed on a display unit, which is a user interface of the information processing apparatus of this technology.
Figure 17:
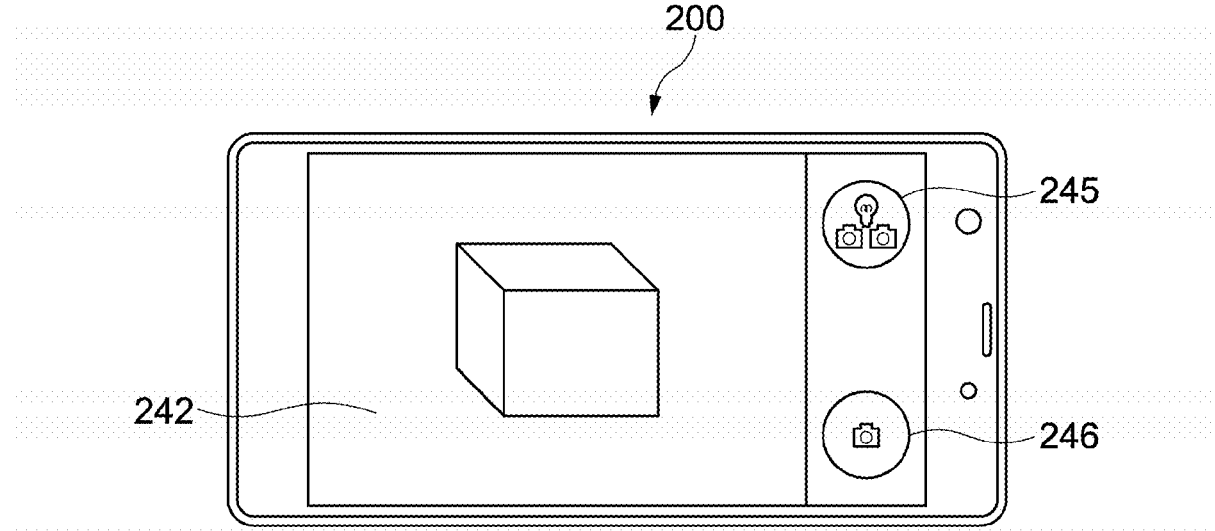
FIG. 17 is a second diagram showing the display window displayed on the display unit, which is a user interface of the information processing apparatus of this technology.

Each of FIG. 16 and FIG. 17 shows a display window displayed on the display unit 242, which is a user interface of the information processing apparatus 200.

As shown in FIG. 16, when the image-taking apparatus 100 takes an image in a normal mode, the display unit 242 of the information processing apparatus 200 displays a live view image taken by the image-taking apparatus 100. A user is capable of confirming the image taken by the image-taking apparatus 100. At the same time, a brightness-mode button 245 and a shutter button 246 are displayed in a predetermined area of the display unit 242, for example. The brightness-mode button 245 is used to brightness of one of two apparatuses. In FIG. 16, an exposure-controlled image based on an exposure value determined based on brightness information on the image-taking apparatus 100, is displayed on the display unit. The information processing apparatus 200 is capable of taking the displayed image.

Here, if the button 245 of the information processing apparatus 200 is touched, as shown in FIG. 17, an image whose exposure is controlled based on an exposure value, which is obtained by correcting the brightness information on the image-taking apparatus 100 based on the brightness information on the information processing apparatus 200, is displayed. The information processing apparatus 200 is capable of taking the displayed image.

Figure 18:
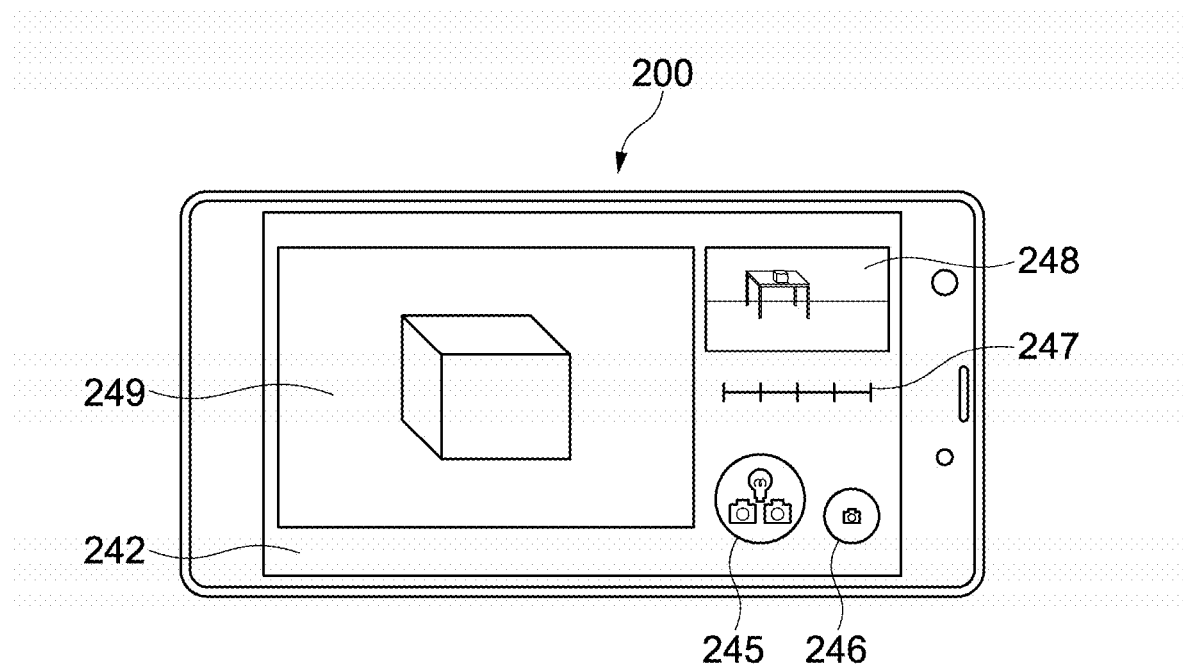
FIG. 18 is a diagram showing another display window displayed on a display unit, which is a user interface of the information processing apparatus of this technology.

Note that FIG. 17 shows an example of automatic exposure control. For example, the information processing apparatus 200 may also be capable of executing a semi-automatic exposure-control mode. As shown in FIG. 18, the display unit 242 may display an exposure-correction setting bar 247. Exposure may be corrected when a user touches the bar 247. As a result, exposure may be corrected just as a user intended. In this case, the display unit 242 may display both an image (live-view image) 248 taken by the information processing apparatus 200 and an image (live-view image) 249 taken by the image-taking apparatus 100. In this case, the display area of the image 249 is larger than the display area of the image 248. As a result, a user is capable of easily recognizing an image to be taken.

This technology is not limited to the above-mentioned embodiments, and may be variously modified within the scope of this technology.

Note that this technology may employ the following configurations.

(1) An image-taking apparatus, including:
a detector configured to detect brightness of an object image, and to output internal brightness information; and
a controller configured to control exposure based on an exposure value, the exposure value being based on the internal brightness information and external brightness information received from an external apparatus.

(2) The image-taking apparatus according to (1), further including:
a setting unit configured to select one of a first exposure value and a second exposure value to be used, the first exposure value being based on the internal brightness information, the second exposure value being based on both of the internal brightness information and the external brightness information, in which
the controller is configured to control exposure based on one of the first exposure value and the second exposure value selected by the setting unit.

(3) The image-taking apparatus according to (1) or (2), further including:
an output unit configured to output an image to the external apparatus, the image being taken with exposure controlled by the controller.

(4) The image-taking apparatus according to any one of (1) to (3), in which
the controller is configured to control exposure based on a first exposure value if the external apparatus does not exist and based on a second exposure value if the external apparatus exists, the first exposure value being based on the internal brightness information, the second exposure value being based on both of the internal brightness information and the external brightness information.

(5) The image-taking apparatus according to any one of (1) to (4), further including:
a wireless receiver configured to receive the external brightness information.

(6) The image-taking apparatus according to any one of (1) to (5), in which
the controller is configured to correct the internal brightness information based on the external brightness information to thereby obtain the exposure value.

(7) The image-taking apparatus according to any one of (1) to (6), in which
the image-taking apparatus is capable of being fixed to the information processing apparatus.

(8) An information processing apparatus, including:
a detector configured to detect brightness of an object image;
a determining unit configured to determine if an external image-taking apparatus exists or not; and
an output unit configured to output the brightness information to the image-taking apparatus if the image-taking apparatus exists.

(9) The information processing apparatus according to (8), further including:
a receiver configured to receive an image sent from the image-taking apparatus.

(10) The information processing apparatus according to (8) or (9), further including:
a controller configured to display an image received by the receiver on a display unit.

(11) The information processing apparatus according to any one of (8) to (10), further including:
an image-taking unit configured to take an object image, in which
the controller is configured to display an image obtained by the image-taking unit and an image received by the receiver on the display unit at the same time.

(12) The information processing apparatus according to any one of (8) to (11), in which
the output unit is configured to output the brightness information wirelessly.

(13) An image-taking system, including:
an information processing apparatus including
a detector configured to detect brightness of an object image, and to output external brightness information,
a determining unit configured to determine if an external image-taking apparatus exists or not, and
an output unit configured to output the external brightness information to the image-taking apparatus if the image-taking apparatus exists; and
an image-taking apparatus including
a detector configured to detect brightness of an object image, and to output internal brightness information, and
a controller configured to control exposure based on an exposure value, the exposure value being based on the internal brightness information detected by the detector and external brightness information received from an external apparatus.

What is claimed is:

1. An image-taking apparatus, comprising:
a detector configured to detect brightness of an object image, and to output internal brightness information;
a setting unit configured to select one of a first exposure value and a second exposure value to be used, the first exposure value being based on the internal brightness information, the second exposure value being based on both of the internal brightness information and external brightness information received from an external apparatus; and
a controller configured to control exposure based on one of the first exposure value and the second exposure value selected by the setting unit.

2. The image-taking apparatus according to claim 1, further comprising:
an output unit configured to output an image to the external apparatus, the image being taken with exposure controlled by the controller.

3. The image-taking apparatus according to claim 1, wherein the controller is configured to control exposure based on the first exposure value in an event the external apparatus does not exist and based on the second exposure value in an event the external apparatus exists.

4. The image-taking apparatus according to claim 1, further comprising:
a wireless receiver configured to receive the external brightness information.

5. The image-taking apparatus according to claim 1, wherein
the controller is configured to correct the internal brightness information based on the external brightness information to thereby obtain the exposure value.

6. The image-taking apparatus according to claim 1, wherein the image-taking apparatus is capable of being fixed to an information processing apparatus.

7. An information processing apparatus, comprising:
a detector configured to detect brightness of an object image;
a determining unit configured to determine whether an external image-taking apparatus exists or not; and
an output unit configured to output first brightness information, generated based on the detected brightness, to the external image-taking apparatus in case the external image-taking apparatus exists,
wherein the external image-taking apparatus is configured to:
select one of a first exposure value and a second exposure value, the first exposure value being based on the output first brightness information, the second exposure value being based on both of the output first brightness information and second brightness information detected by the external image-taking apparatus, and
control exposure based on one of the selected first exposure value and the selected second exposure value.

8. The information processing apparatus according to claim 7, further comprising:
a receiver configured to receive another image sent from the external image-taking apparatus.

9. The information processing apparatus according to claim 8, further comprising:
a controller configured to display the other image received by the receiver on a display unit.

10. The information processing apparatus according to claim 7, further comprising:
an image-taking unit configured to capture the object image, and
a controller is configured to display the captured object image and another image received from the external image-taking apparatus, on a display unit at the same time.

11. The information processing apparatus according to claim 7,
wherein the output unit is configured to output the first brightness information wirelessly.

12. An image-taking system, comprising:
an information processing apparatus including
a detector configured to detect brightness of an object image, and to output external brightness information,
a determining unit configured to determine if an external image-taking apparatus exists or not, and
an output unit configured to output the external brightness information to the image-taking apparatus if the image-taking apparatus exists; and
an image-taking apparatus including
a detector configured to detect brightness of an object image, and to output internal brightness information, and
a controller configured to control exposure based on an exposure value, the exposure value being based on the internal brightness information detected by the detector and external brightness information received from an external apparatus.

* * * * *